United States Patent
Reuven et al.

(10) Patent No.: US 6,452,978 B1
(45) Date of Patent: Sep. 17, 2002

(54) COMBINED SHAPING AND PEAK-TO-AVERAGE REDUCTION FOR SINGLE CARRIER MODULATION SYSTEMS

(75) Inventors: Ilan Reuven; Liron Frenkel, both of Ramat Gan (IL)

(73) Assignee: Tioga Technologies Inc., San Jose, CA (US)

( * ) Notice: Subject to any disclaimer, the term of this patent is extended or adjusted under 35 U.S.C. 154(b) by 0 days.

(21) Appl. No.: 09/248,633

(22) Filed: Feb. 11, 1999

(51) Int. Cl.$^7$ ................................................. H04L 5/12
(52) U.S. Cl. ....................................... 375/265; 714/792
(58) Field of Search ......................... 375/254, 261–265, 375/296, 295; 714/786, 792; 332/103

(56) References Cited

U.S. PATENT DOCUMENTS

| | | | | |
|---|---|---|---|---|
| 4,959,842 A | * | 9/1990 | Forney, Jr. .................... | 375/261 |
| 5,150,381 A | | 9/1992 | Forney, Jr. et al. ........... | 375/39 |
| 5,214,672 A | * | 5/1993 | Eyuboglu et al. ............ | 375/254 |
| 5,388,124 A | | 2/1995 | Laroia et al. ................ | 375/286 |
| 5,455,839 A | * | 10/1995 | Eyuboglu .................... | 375/265 |
| 5,493,587 A | * | 2/1996 | Sandri et al. ................ | 375/285 |
| 5,559,561 A | | 9/1996 | Wei ............................. | 348/470 |
| 5,623,513 A | | 4/1997 | Chow et al. ................. | 375/219 |
| 5,854,812 A | | 12/1998 | Huber et al. ................ | 375/296 |

FOREIGN PATENT DOCUMENTS

| | | | | |
|---|---|---|---|---|
| EP | 0 383 632 | | 8/1990 | ........... H04L/27/34 |
| EP | 0 397 537 | | 11/1990 | ........... H04L/27/00 |

OTHER PUBLICATIONS

M. Vedat Eyuboglu, et al., "Trellis Precoding: Combined Coding, Precoding and Shaping for Intersymbol Interference Channels", IEEE Transactions on Information Theory, vol. 38, No. 2, Mar. 1992, pp. 301–314.

G. David Forney, Jr. "Trellis Shaping", IEEE Transactions on Information Theory, vol. 38, No. 2, Mar. 1992, pp. 281–300.

G, David Forney, Jr., "The Viterbi Algorithm", Proceedings of the IEEE, vol. 61, No. 3, Mar. 1973, pp. 268–278.

Andrew J. Viterbi, "Error Bounds for Convolutional Codes and an Asymptotically Optimum Decoding Algorithm", IEEE Transactions on Information Theory, vol. IT–13, No. 2, Apr. 1967, pp. 260–269.

Robert F. H. Fischer, et al., "Dynamics Limited Precoding, Shaping, and Blind Equalization for fast Digital Transmission Over Twisted Pair Lines", IEEE Journal on Selected Areas in Communications, vol. 13, No. 9, Dec. 1995, pp. 1622–1633.

A. E. Jones, et al., "Block Coding Scheme for Reduction of Peak to Mean Envelope Power Ratio of Multicarrier Transmission Schemes", Electronics Letters, Dec. 8, 1994, vol. 30, No. 25, pp. 2098–2099.

S. J. Shepherd, et al., "Simple Coding Scheme to Reduce Peak Factor in QPSK Multicarrier Modulation", Electronics Letters. Jul. 6, 1995, vol. 31, No. 14, pp. 1131–1132.

Denis J. G. Mestdagh, et al., "A Method to Reduce Probability of Clipping in DMT–Based Transceivers", IEEE Transactions on Communications, vol. 44, No.10, Oct. 1996, pp. 1234–1238.

* cited by examiner

*Primary Examiner*—Stephen Chin
*Assistant Examiner*—Chieh M. Fan
(74) *Attorney, Agent, or Firm*—Abelman, Frayne & Schwab

(57) ABSTRACT

A method is described for mapping digital input data, including a sequence of input samples, into an interim signal point sequence, for use in conjunction with a single carrier modulation transmitter. The method includes generating a set of candidate signal point sequences, for each input sample, selecting an interim signal point sequence, into which to map the sequence of input samples, from among the set of candidate signal point sequences, so as to obtain a low peak power value of a final signal generated from the interim signal point sequence, and using a single carrier modulation transmitter to transmit the final signal to a receiver.

10 Claims, 12 Drawing Sheets

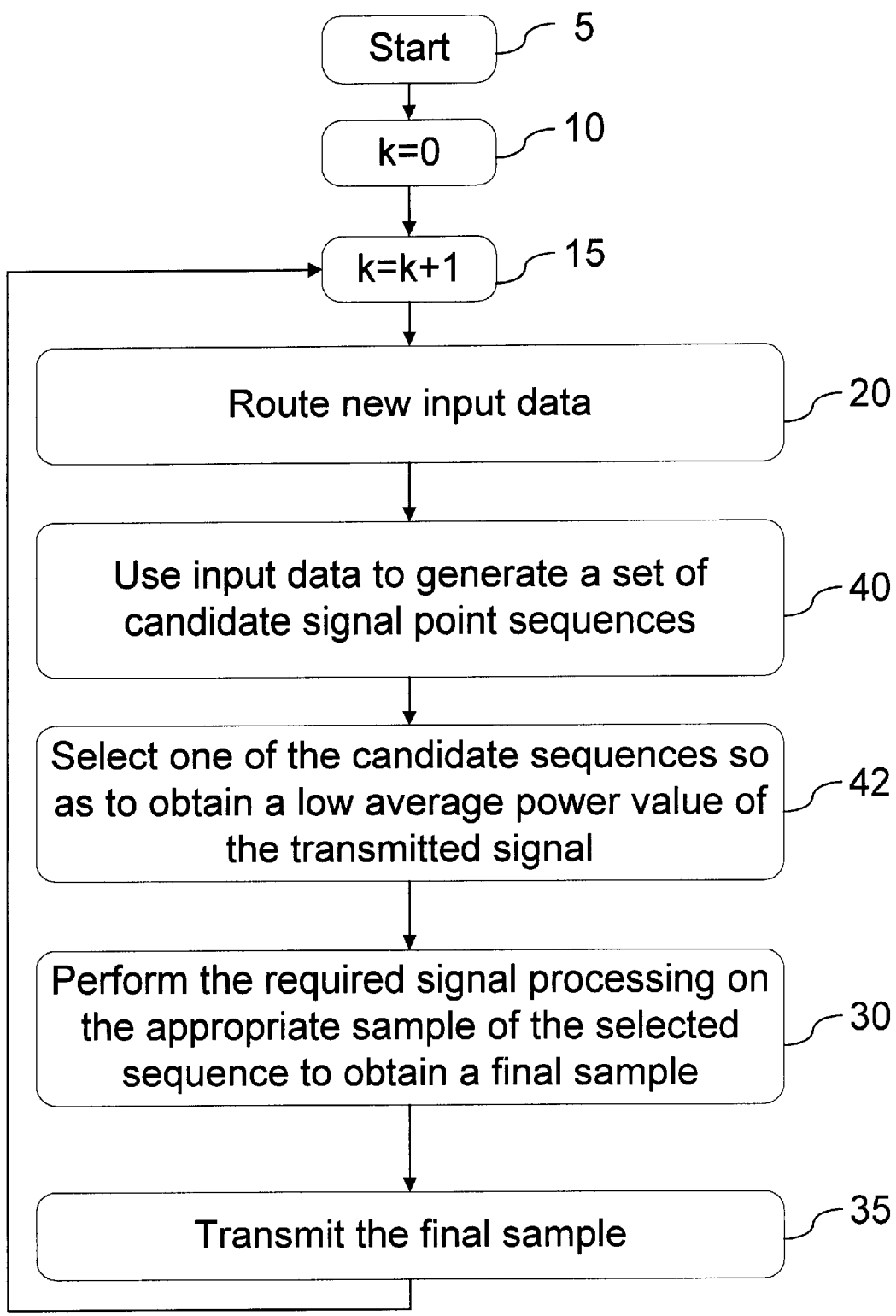
Fig. 1B - Prior Art

| $j$ | 0 | 1 | 2 | 3 |
|---|---|---|---|---|
| $c_2(j)$ | 0 | 0 | 1 | 1 |
| $c_1(j)$ | 0 | 1 | 1 | 0 |

| $j$ | $a1(j)$ | $a2(j)$ |
|---|---|---|
| 0 | SYM(0) | SYM(3) |
| 1 | SYM(1) | SYM(2) |
| 2 | SYM(1) | SYM(2) |
| 3 | SYM(0) | SYM(3) |
| 4 | SYM(2) | SYM(1) |
| 5 | SYM(3) | SYM(0) |
| 6 | SYM(3) | SYM(0) |
| 7 | SYM(2) | SYM(1) |
| 8 | SYM(3) | SYM(0) |
| 9 | SYM(2) | SYM(1) |
| 10 | SYM(2) | SYM(1) |
| 11 | SYM(3) | SYM(0) |
| 12 | SYM(1) | SYM(2) |
| 13 | SYM(0) | SYM(3) |
| 14 | SYM(0) | SYM(3) |
| 15 | SYM(1) | SYM(2) |

Fig. 6

COMBINED SHAPING AND PEAK-TO-AVERAGE REDUCTION FOR SINGLE CARRIER MODULATION SYSTEMS

FIELD OF THE INVENTION

The present invention relates to modulation systems for transmission of digital data over a channel.

BACKGROUND OF THE INVENTION

The present invention relates to digital transmission systems using single carrier modulation. The method of the present invention is compatible with shaping, and it permits any type of precoding and coding. This invention may be implemented in a system that incorporates none, some, or all of the above techniques.

Shaping is a method of selecting a signal point sequence from a subset of all allowable signal point sequences based on the respective powers of the candidate sequences. The objective of shaping is to achieve a nonuniform, Gaussian-like distribution over an expanded constellation, so as to reduce the average signal power at the same data rate. This power reduction is called shaping gain. Trellis shaping is one of the well-known shaping techniques in which the transmitter selects a sequence by a search through the trellis diagram of a convolutional shaping code, and wherein the set of all candidate sequences is not a simple Cartesian product of finite-dimensional regions.

Trellis shaping for modulation systems is described in U.S. Pat. No. 5,150,381 to Forney, Jr. et al.; in Forney "Trellis Shaping" *IEEE Trans. Inform. Theory,* vol. 38 no. 2, pp. 281–300, March 1992; and in Eyuboǧlu et al. "Trellis precoding: combined coding, precoding and shaping for intersymbol interference channels," *IEEE Trans. Inform. Theory,* vol. 38, no. 2, pp. 301–314, March 1992.

Another shaping method is described in Fischer et al. "Dynamics limited precoding, shaping, and blind equalization for fast digital transmission over twisted pair lines," *IEEE J Select. Areas on Commun.,* vol. 13, no. 9, pp. 1622–1633, December 1995.

Shaping methods use an expanded signal constellation in which the symbols have a plurality of representations. This expansion increases the peak-to-average ratio of the samples generated. The ratio may be limited by employing some peak constraints, such as selecting output samples whose absolute value is less than a predetermined threshold value. The samples generated by the shaping method are further processed by the transmitter, and the peak-to-average value of the transmitted signal is usually higher than that of the samples generated by the shaping method.

Precoding is another practicable (nonlinear) processing in digital transmission systems operating over InterSymbol Interference (ISI) channels. In this scheme, the channel response has to be known at the transmitter. A precoder performing precoding, eliminates the need for a Decision Feedback Equalizer (DFE) at a receiver, and thus has two prominent advantages.

1. As operation of a DFE requires zero delay decisions, and whereas any coding scheme entails some delay in the decision path, channel coding cannot be directly combined with a DFE. Thus precoding enables the use of coding over ISI channels in the same manner as for channels without ISI.
2. Error propagation that is ascribed to the DFE is avoided in the alternative scheme that utilizes a precoder.

There are numerous ways to combine precoding with shaping. One of these combinations is known as trellis precoding which combines trellis shaping and precoding.

The peak-to-average ratio of the transmitted signal plays a major role in the design of analog circuitry and has a direct impact on the complexity and power consumption of this circuitry. In a transmitter, when the signal amplitude exceeds the maximum input value of a D/A converter, the output signal is typically clipped to a threshold level which results in a distorted transmitted signal, and degrades the system performance. Conversely, the design of a system that accommodates a high peak-to-average ratio entails the use of high power analog drivers. Numerous methods for reducing the peak-to-average value of the transmit signal of multicarrier transmission schemes have been proposed where this problem is most critical, for example in the following:

A. E. Jones et al., "Block coding scheme for reduction of peak to mean envelope power ratio of multicarrier transmission schemes." *Electronics Letters,* vol. 30. no. 25, pp. 2098–9, December 1994;

S. J. Shepherd et al., "Simple coding scheme to reduce peak factor in QPSK multicarrier modulation." *Electronics Letters,* vol.31. no.14, pp. 1131–2, July 1995;

U.S. Pat. No. 5,623,513 to Chow et al.; and

G. Mestdagh and P. M. P. Spruyt, "A method to reduce the probability of clipping in DMT based transceivers." *IEEE Trans. Commun.,* vol.44, no.10, pp.1234–8, October 1996.

These methods are based on processing blocks of digital data, and hence cannot be used in systems that employ single carrier modulation which operates sequentially.

Viterbi search methods are described in:

A. J. Viterbi, "Error bounds for convolutional codes and an asymptotically optimum decoding algorithm." *IEEE Trans. Inform. Theory vol.IT*-13, pp.260–9, April 1967; and D. G. Forney, Jr., "The Viterbi Algorithm." *Proc. IEEE* vol.61, pp.268–78, March 1973.

The disclosures of all publications mentioned in the specification and of the publications cited therein are hereby incorporated by reference.

SUMMARY OF THE INVENTION

The present invention seeks to provide transmission systems incorporating one or both of shaping and precoding. The proposed method is also compatible with coding. A preferred embodiment of the present invention generates a plurality of signal point sequences and selects one sequence for transmission. This selection is carried out in a manner tending to reduce the peak power of the transmitted signal. This selection can also be carried out in a manner tending to minimize both the peak power, and the average power, of the transmitted signal. Methods that generate a plurality of candidate signal point sequences, and select one sequence for transmission based on the average powers of the candidate sequences were originally proposed for shaping. However, in the present invention, the selection criteria is modified. In order to realize these selection criteria, the present invention also includes means for predicting the level of the final signal at the output of the transmitter when each one of the candidate sequences is selected for transmission and routed for further processing by filters and other units included in the transmitter.

There is thus provided in accordance with a preferred embodiment of the present invention a method for mapping digital input data, including a sequence of input samples, into an interim signal point sequence, for use in conjunction with a single carrier modulation transmitter, the method including generating a set of candidate signal point sequences characterized in that the original digital input data is recoverable from a final signal, for each input sample, selecting an interim signal point sequence, into which to map the sequence of input samples, from among the set of candidate signal point sequences, so as to obtain a low peak power value of a final signal generated from the interim signal point sequence by the signal processing procedure, relative to the peak power values of the final signals generated respectively by other sequences within the set of candidate signal point sequences by the signal processing unit, and using a single carrier modulation transmitter to transmit the final signal generated from the interim signal point sequence, sample by sample, to a receiver, thereby to reduce the peak power value of the final signal generated from the interim signal point sequence for each individual input sample in an input data sequence, relative to the peak power value of a final signal generated from a single, fixed signal point assigned to the individual input sample in the input data sequence, wherein the final signal is composed of a sequence of samples each derived from the interim signal point sequence selected for a corresponding input sample, and wherein the original data is recoverable by a receiver without knowledge as to the identity of the interim signal point sequence selected for each input sample.

Further in accordance with a preferred embodiment of the present invention the method includes, at a receiver, receiving and recovering the original digital input data without using information regarding the selecting step.

Still further in accordance with a preferred embodiment of the present invention the selecting step is also operative to select the interim signal point sequence so as to obtain a relatively low average power value of the final signal generated from the interim signal point sequence by the signal processing procedure, relative to the average power values of the final signals generated respectively from other sequences from among the set of candidate signal point sequences by the signal processing procedure, thereby to reduce the average power value of the final signal generated from the interim signal point sequence for each individual input sample in an input data sequence, relative to the average power value of a final signal generated from a single, fixed signal point assigned to the individual input sample in the input data sequence, for any given signal processing procedure.

Additionally in accordance with a preferred embodiment of the present invention the selecting step is also operative to select the interim signal point sequence so as to obtain a relatively low average power value of the interim signal point sequence, relative to the average power values of the other sequences from among the set of candidate signal point sequences, thereby to reduce the average power value of the interim signal point sequence for each individual input sample in an input data sequence, relative to the average power value of a single, fixed signal point assigned to the individual input sample in the input data sequence, for any given signal processing procedure.

Further in accordance with a preferred embodiment of the present invention the selecting step is based at least partly on an analysis of the average power value of the final signal generated from the interim signal point sequence by the signal processing procedure.

Still further in accordance with a preferred embodiment of the present invention the selecting step is based at least partly on an analysis of the average power value of the interim signal point sequence.

There is also provided in accordance with another preferred embodiment of the present invention, a system for mapping digital input data, including a sequence of input samples, into an interim signal point sequence, for use in conjunction with a single carrier modulation transmitter, the system including a candidate set generator operative to generate a set of candidate signal point sequences characterized in that the original digital input data is recoverable from a final signal, and an interim signal point sequence selector operative, for each input sample, to select an interim signal point sequence, into which to map the sequence, from among the set of candidate signal point sequences, so as to obtain a low peak power value of a final signal generated from the interim signal point sequence by the signal processing procedure, relative to the peak power values of the final signals generated respectively by other sequences within the set of possible signal point sequences, by the signal processing unit, wherein the final signal is composed of a sequence of samples each derived from the interim signal point sequence selected for a corresponding input sample, and wherein the original data is recoverable by a receiver without knowledge as to the identity of the interim signal point sequence selected for each input sample.

Additionally in accordance with a preferred embodiment of the present invention the system also includes a single carrier modulation transmitter operative to transmit the final signal generated from the interim signal point sequence, sample by sample, to a receiver.

Further in accordance with a preferred embodiment of the present invention the system also includes a receiver, receiving and recovering the original digital input data without using selection information from the sequence selector.

Still further in accordance with a preferred embodiment of the present invention the selecting step includes employing a set of prediction filters to predict an output signal level of the signal processing procedure if each of the candidate signal point sequences in the candidate sequence set is selected, and wherein selection of an interim sequence is at least partially based on the output of the prediction filters.

Additionally in accordance with a preferred embodiment of the present invention the set of candidate signal point sequences is associated with a finite state trellis diagram.

Further in accordance with a preferred embodiment of the present invention the selecting step includes a search through the trellis diagram.

Still further in accordance with a preferred embodiment of the present invention the selecting step includes a Viterbi-algorithm type search.

Additionally in accordance with a preferred embodiment of the present invention the system also performs precoding.

BRIEF DESCRIPTION OF THE DRAWINGS

The present invention will be understood and appreciated from the following detailed description, taken in conjunction with the drawings in which:

FIG. 1B is a simplified flowchart illustration of a prior art method, which incorporates shaping for mapping digital input data, comprising a sequence of input samples, into interim signal point sequences, for use in conjunction with a single carrier modulation transmitter;

FIG. 6 is a table showing an output matrix for a $4^{th}$ order convolutional code whose generator matrix is $[1+D+D^4, 1+D^2+D^3+D^4]$, used by the Sequence Set Generator of FIG. 3;

DETAILED DESCRIPTION OF PREFERRED EMBODIMENTS

Figure 1A:
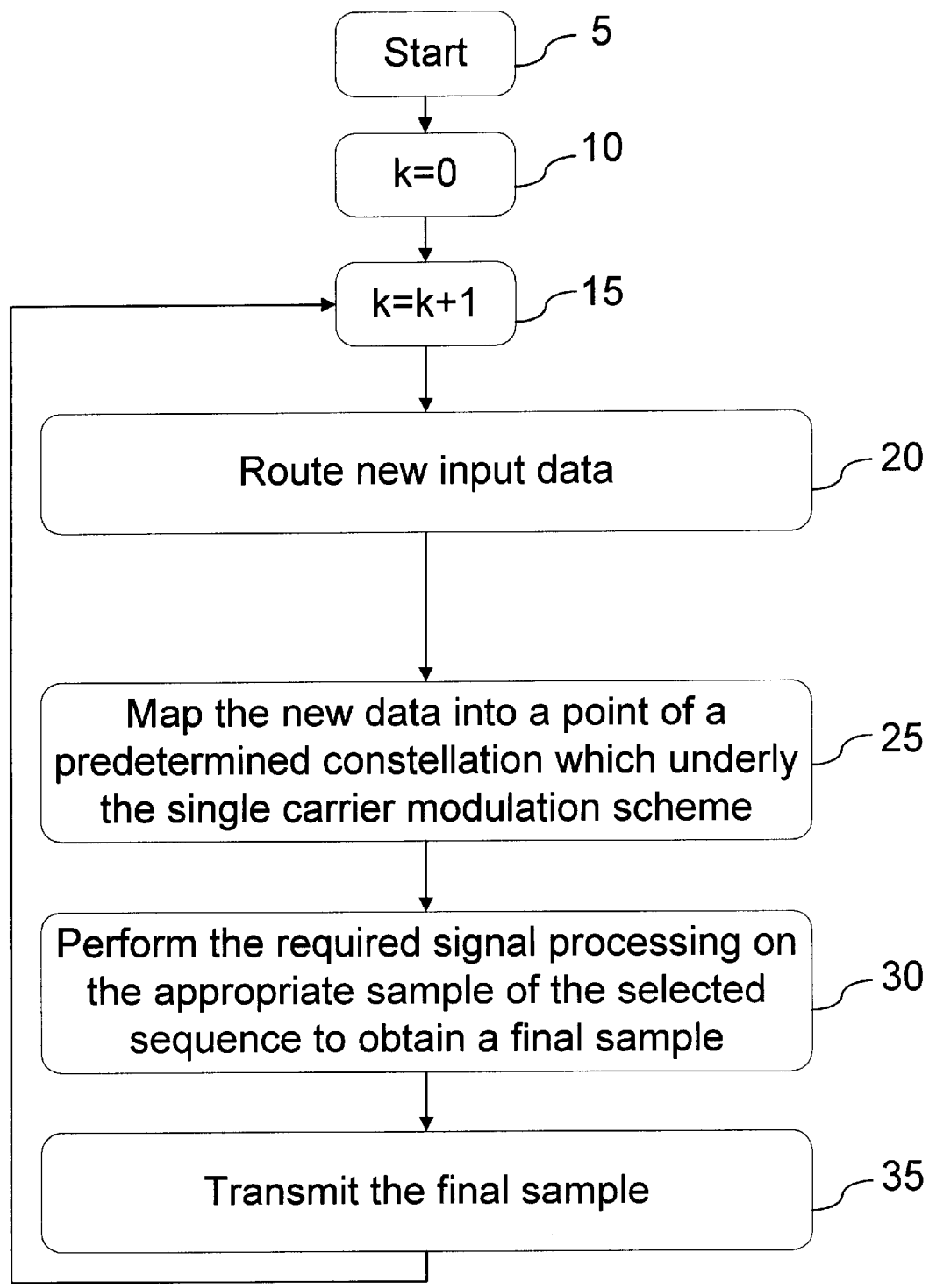
FIG. 1A is a simplified flowchart illustration of a prior art method, which does not incorporate shaping, for mapping digital input data, comprising a sequence of input samples, into interim signal point sequences, for use in conjunction with a single carrier modulation transmitter.

FIG. 1A is a simplified flowchart illustration of a prior art method, which does not incorporate shaping, for mapping digital input data, comprising a sequence of input samples, into interim signal point sequences, for use in conjunction with a single carrier modulation transmitter. In this method there is a fixed mapping of input data into signal points.

FIG. 1B is a simplified flowchart illustration of a prior art transmission method which incorporates shaping. This method maps digital input data, comprising a sequence of input samples, into interim signal point sequences, for use in conjunction with a single carrier modulation transmitter, in a manner tending to reduce the average power of the transmitted signal. Such prior art shaping methods typically involve the generation of a plurality of candidate sequences, where S denotes the total number of candidate sequences generated. At each symbol iteration k (15), a sequence is selected from among the candidate sequences $\{x_i(k), i=0,1, \ldots, S-1\}$. The method involves routing out a sample x(k) which is set to a sample with a predetermined delay from the selected sequence $x_i^k(k-F)$, where $$x_i(k)=\{x_i^k(k), x_i^k(k-1), x_i^k(k-2), \ldots, x_i^k(k-L)\}.$$

The sequence induced by these selections carried out at each symbol iteration $x(D)=\{x(k), x(k-1), \ldots, \}$ is constrained to be an allowable sequence, i.e. a sequence from which the input data is recoverable at the receiver. The selecting is performed by maintaining a cost for each candidate sequence that represents the average power of the candidate sequences. An example of such a method may be found in Forney ("Trellis shaping," *IEEE Trans. Inform. Theory*, vol. 38, no. 2, pp. 281–300, March 1992). Instances of shaping methods applicable to transmitters that employ preceding are Eyuboğlu et al. ("Trellis preceding: combined coding, preceding and shaping for intersymbol interference channels," *IEEE Trans. Inform. Theory*, vol. 38, no. 2, pp. 301–314, March 1992) and Fischer et al. ("Dynamics limited preceding, shaping, and blind equalization for fast digital transmission over twisted pair lines," *IEEE J. Select. Areas on Commun.*, vol. 13, no. 9, pp. 1622–1633, December 1995).

Figure 2:
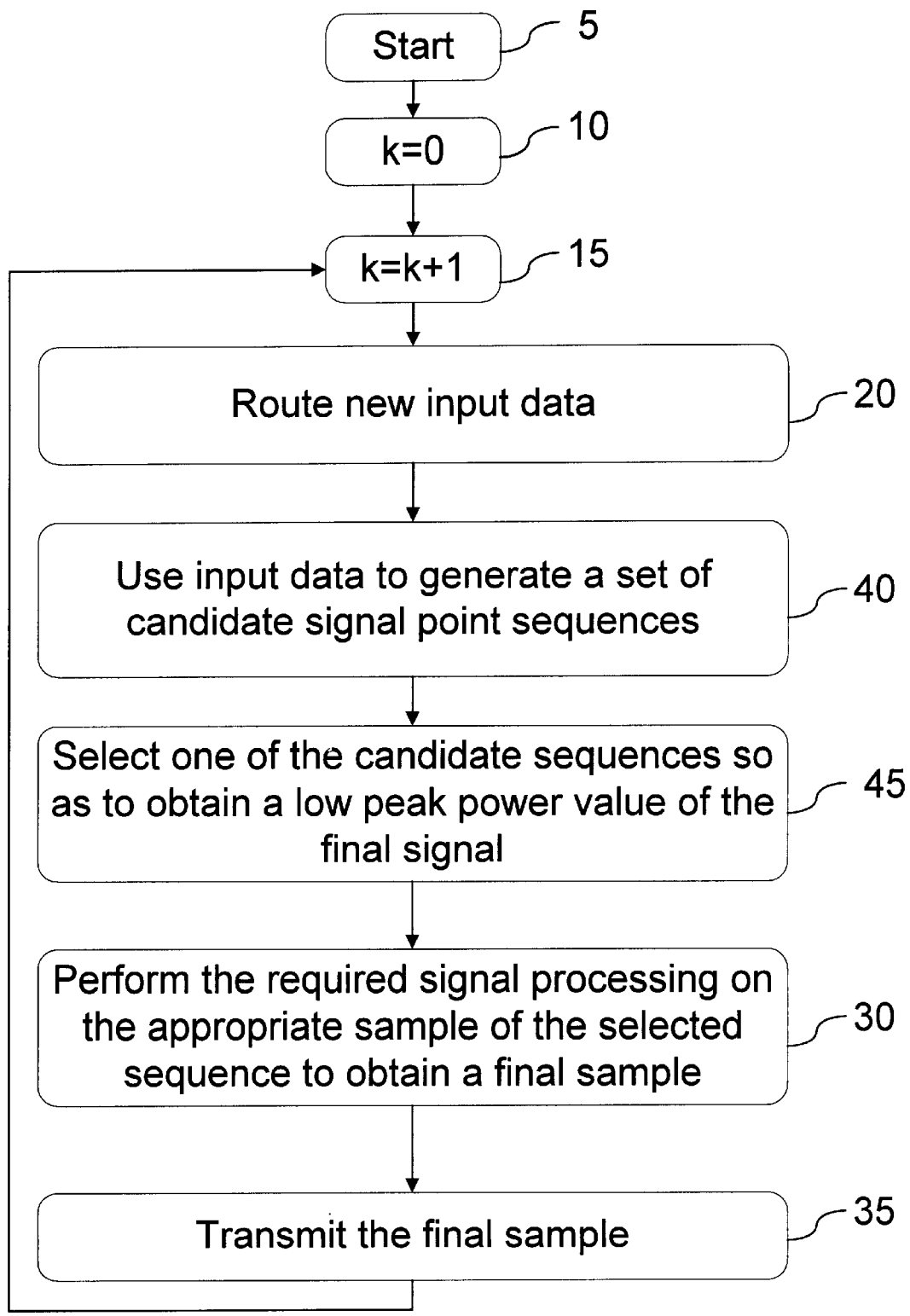
FIG. 2 is a simplified flowchart illustration of a preferred method for mapping digital input data, comprising a sequence of input samples, into interim signal point sequences, for use in conjunction with a single carrier modulation transmitter.

FIG. 2 is a simplified flowchart illustration of a preferred method for mapping digital input data, comprising a sequence of input samples, into interim signal point sequences, for use in conjunction with a single carrier modulation transmitter. The method of FIG. 2, a preferred embodiment of the present invention, differs from the prior art shaping method of FIG. 1, in that one of the candidate sequences is selected so as to reduce the peak power of the final transmitted signal (45), rather than selected so as to reduce the average power of the transmitted signal (42). It is appreciated, however, that the method of FIG. 2 can be used to achieve both of these reductions.

In the method of FIG. 2, new input data (20) is used to generate a set of candidate signal point sequences (40). The selection of one of these candidate sequences, so as to obtain a low peak power of the transmitted signal (step 45), is preferably based upon a set of checks carried out on at least a portion of each candidate sequence. The checks may be represented as a plurality of filtering operations of portions of the candidate sequences. The filtering operations account for the response of the different subsequent subunits of the transmitter. These filters are used to predict the level of the signal generated by the transmitter at some discrete time instants, when each one of the candidate sequences is selected for transmission. The system estimates what would be the final signal level when each one of the sequences is selected. Based on this estimate only one of the sequences is selected and processed by the subsequent processing units (step 30) of the transmitter.

Costs are assigned to each one of the candidate sequences. The costs are determined so as to make the selection of a sequence which results in a signal that exceeds a defined threshold level, less probable. Furthermore, these costs may be updated such that their actual value represent both the average power of the sequences and the information regarding the peak power. Alternatively, the information provided by the check set may be used by employing one cost set, and a second set may be used to represent the average power of the sequences. In this case, the selection of a winner sequence will be based on the two cost values ascribed to each candidate sequence.

N denotes the total number of filters used to process each one of the candidate sequences, and the coefficients of the ith filter are denoted by $\{c_j^i, j=0,1, \ldots, M-1\}$. Preferably, these filters are an approximation of the aggregated response of all the digital and analog units and circuits of the transmitter, which process the selected samples. The N different filters may be used to approximate this aggregated response at different time instances within a symbol period. At time instant k, this preferred method evaluates N values associated with each of the candidate sequences as follows, and N·S values in total $\{P_j^i, i=0,1, \ldots, N-1, j=0,1, \ldots, S-1\}$, where $$P_j^i = \sum_{l=0}^{M-1} c_l^i \cdot x_j^k(k-l-B),$$

where B is a non-negative constant which may be set to zero. The values $\{P_j^i = 0,1, \ldots, N-1, j=0,1, \ldots, S-1\}$ are used to grade the candidate sequences by changing the cost assigned to each candidate sequence, so as that a sequence related to at least one $P_j^i$ with a large absolute value will be assigned a cost that makes its selection as a winner sequence less probable.

In the following description, a single cost array is used, and the values of the set of costs are changed in accordance with the values of $P_j^i$, according to the following rules.

1. When the system does not incorporate shaping, and the target is to reduce the peak power regardless of the resulting average power, the rule is as follows. The cost of each candidate sequence is set to the maximum absolute value of $P_j^i$ associated with any sample of the candidate sequence (for which the prediction can already be carried out), where the maximization is done over all possible values of i, that is, i=0,1, . . . ,N−1.
2. When the system incorporates shaping to reduce the average level of the transmit signal, the updating rule is as follows. If at least one entry of the set $\{P_j^i, i=0,1, \ldots ,N-1\}$ exceeds a predetermined threshold value Th, then a predetermined constant Cost is added to the cost corresponding to the checked sequence.

It is noted that the two updating rules described hereinabove are just examples and many other rules may be used to achieve the same aims. For example, the rules may utilize several cost arrays, where each array measures a different figure of merit.

Throughout the description the two periods: symbol iteration and state iteration are distinguished. Each symbol iteration consists of S state iterations and a final decision. In each one of the state iterations, the method decides on the best path that terminates at one of the trellis states. At the end of all the S state iterations the method chooses the tentative best path among the S previously chosen surviving paths.

Figure 3:
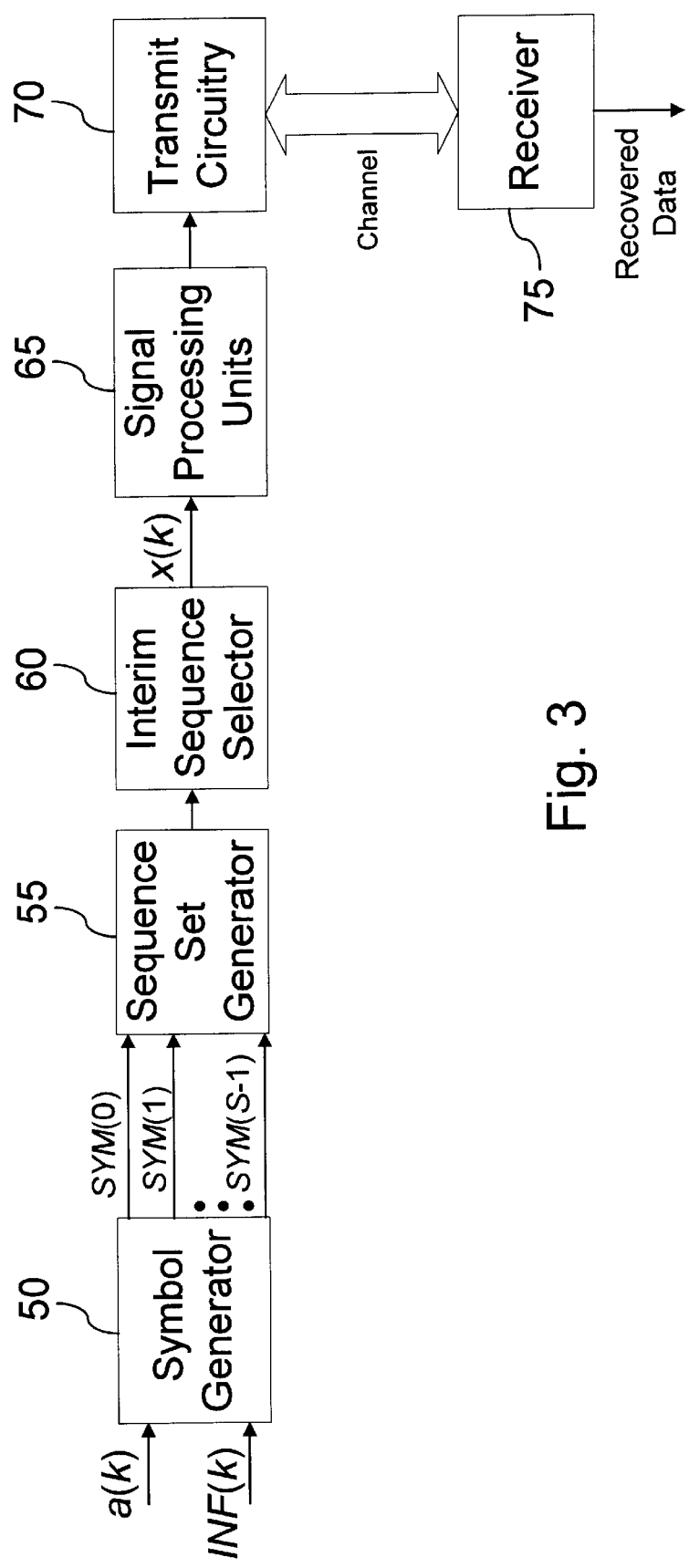
FIG. 3 is a simplified functional block diagram of a hardware environment in which the method of FIG. 2 is useful.

FIG. 3 is a simplified functional block diagram of a hardware environment in which the method of FIG. 2 is useful. As shown, the system comprises the following subunits: a Symbol Generator (50), a Sequence Set Generator (55), an Interim Sequence Selector (60), Signal Processing Units (65) Transmit Circuitry (70) and a Receiver (75).

The Symbol Generator (50) performs a precomputation required for the operation of the Sequence Set Generator (55) and produces the samples that feed into it. The Symbol Generator (50) receives at its input, at time instant k, a symbol a(k) and an optional information bit INF(k). The symbol ak is generated by a PAM Mapper, and represents coded or uncoded information bits. The Symbol Generator (50) uses a(k) and INFO to generate a plurality of symbols denoted by {SYM(0), SYM(1), . . . , SYM(S−1)} which are determined in accordance with the method used to generate the set of candidate sequences. The additional information bit may not be required in some methods. The set of candidate sequences for use in conjunction with shaping, may be generated as proposed in the above-referenced article by Forney 1992, and the modification of this method for use in systems that incorporate preceding may be found in the above-referenced article by Eyuboğlu et al. 1992.

The shaping method suggested by Forney utilizes a lattice-type coset code based on a convolutional code which defines the possible symbol codewords and which is used to encode the information bit. In this method, the range of the input symbol ak may be set to one fourth of the entire range of the symbols at the output of the Symbol Generator (50).

The Symbol Generator (50) operates as follows. At each iteration, the information bit INF(K) is converted to a mathematically two-bit coset representative t(k). One of the bits of this bit pair may be set to zero. The sequence t(D) is generated by the n×(n−k) (right) inverse syndrome former matrix $[H(D)]^{-1}$, where H(D) is the (n−k)×n parity-check matrix of the underlying code whose rate is k/n.

$H(D) \cdot [H(D)]^{-1} = I_{(n-k)}$, where $I_{(n-k)}$ denotes the (n−k)×(n−k) identity matrix. This inverse syndrome matrix is not unique. Its choice also determines the parity-check matrix to be used at the receiver (75) in order to recover the original bit sequence. The syndrome of the sum of the sequence t(D) and any of the codewords of the code is the information sequence INF(D), i.e. $H^T(D)[t(D) \oplus c_s(D)] = INF(D)$, where $c_s(D)$ is a legal sequence of the code, where the superscript T denotes the transpose matrix, and the notation $\oplus$ stands for an Exclusive OR operation.

A rate-1/2 binary code is used, for example. $G(D) = [g_1(D), g_2(D)]$ is a generator matrix of the code, where $g_1(D)$ and $g_2(D)$ are polynomials of D. The degree of these polynomials determines the number of states of the convolutional code. A corresponding parity-check matrix is $H(D) = [g_2(D), g_1(D)]$, and a corresponding inverse syndrome former matrix is $[H(D)]^{-1} = [1/g_2(D), 0]^T$, and t(D) is set to INF(D) $\cdot [1/g_2(D), 0]^T$. In the trellis diagram of this code, there are two edges branching from each state, and two edges branch into each trellis state. The inverse syndrome former may be implemented as an Infinite Impulse Response (IIR) "binary filter". According to this implementation, $g_2(D) = 1 + g_{21} \cdot D + g_{22} \cdot D^2 + \ldots + g_{2G} \cdot D^G$, where each $g_{2j}$ is a binary entry, j=1,2, . . . ,G. The bit-pair t(k) at time instant k (in which one of the elements is always 0), is generated according to the following formula:

$$t(k)=[t_1(k), t_2(k)]=[INF(k) \oplus [g_{21} \otimes t(k<1)] \oplus [g_{22} \otimes t(k-2)] \oplus \ldots \oplus [g_{2G} \otimes t(k-G)], 0]$$

where the notation $\otimes$ stands for the bitwise AND operation. The bit pair t(k) is "scrambled" with the output bits of every trellis transition determined by the code.

Figures 4, 5:
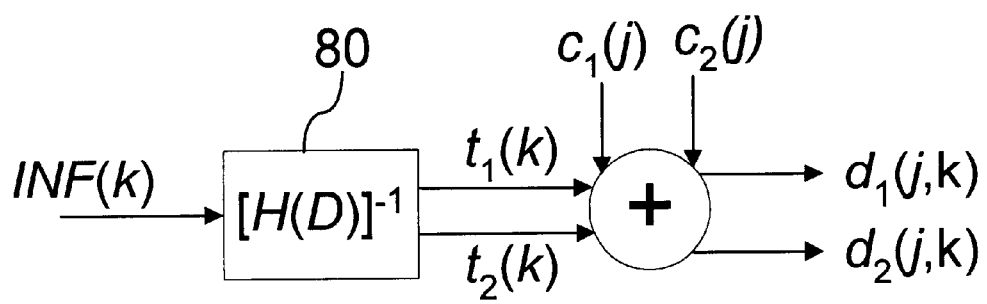
FIG. 4 is a table showing Index to bit-pair mapping performed by the Symbol Generator of FIG. 3.
FIG. 5 is a simplified block diagram of the scrambling operation of the Symbol Generator of FIG. 3.

FIG. 4 is a table showing Index to bit-pair mapping performed by the Symbol Generator of FIG. 3.

FIG. 5 is a simplified block diagram of the scrambling operation of the Sequence Set Generator of FIG. 3. The bit-pair t(k) is used to generate a plurality of symbols at the output of the Symbol Generator (50). The following is an example of a conversion of a symbol a(k) and an input bit INF(k) to a plurality of symbols {SYM(0),SYM(1), . . . , SYM(S−1)}. The trellis code is typically characterized by two matrices: the transition matrix that describes the possible state transitions, and the output matrix that depicts the symbols corresponding to these transitions. For a rate-1/2 code each such symbol is a bit-pair. There are four possible combination of bit pairs, and hence in this implementation the Symbol Generator (50) has to generate four distinct symbols. In order to generate these symbols, the sequence t(k) to is used to generate a second sequence $d(j,k) = [d_1(j,k), d_2(j,k)]$ which is generated by the following bit operations:

$$d(j,k) = t(k) \oplus c(j) = [t_1(k) \oplus c_1(j) t_2(k) \oplus c_2(j)]$$

where c(j) denotes a mapping of the integer j, $0 \leq j \leq 3$, to a bit-pair as illustrated in FIGS. 4 and 5.

The set of output symbols is generated using the input symbol and the sequence d(k). For example, if the output symbols ranges over [−M,M], and the input symbol takes on values in the range [−M,−M/2], then the Symbol Generator typically provides four distinct symbols SYM(0),SYM(1), SYM(2) and SYM(3), where $$SYM(j) = M/2 \cdot \{2d_1(j,k) + d_2(j,k)\} + a(k).$$

The mapping depicted in the above formula represents the constellation expansion. The range of the symbols at the output of the Symbol Generator is four times larger than the range of the symbols at its input. The following is an example of a code and of the induced processing. The octal representation of the generators of the proposed code is (23,35), i.e., the generator matrix G(D) of the code is given by $[1+D+D^4, 1+D^2+D^3+D^4]$, and the free distance of the code is 7. The corresponding inverse syndrome former matrix is $[H(D)]^{-1}=[1/(1+D^2+D^3+D^4), 0]^T$. Consequently, at the receiver, the syndrome bit is recovered by decoding the estimate of t(D) by the parity-check matrix $H(D)=[1+D^2+D^3+D^4, 1+D+D^4]$. The bit-pair t(k) is generated at the transmitter as follows:

$$t(k)=[t_1(k)t_2(k)]=[\text{INF}(k)\oplus t(k-2)\oplus t(k-3)\oplus t(k-4)0].$$

FIG. 6 is a table showing an output matrix for a $4^{th}$ order convolutional code whose generator matrix is $[1+D+D^4, 1+D^2+D^3+D^4]$, used by the Sequence Set Generator of FIG. 3. FIG. 6 lists the symbols corresponding to each transition of the trellis diagram of the above convolutional code.

Figure 7:
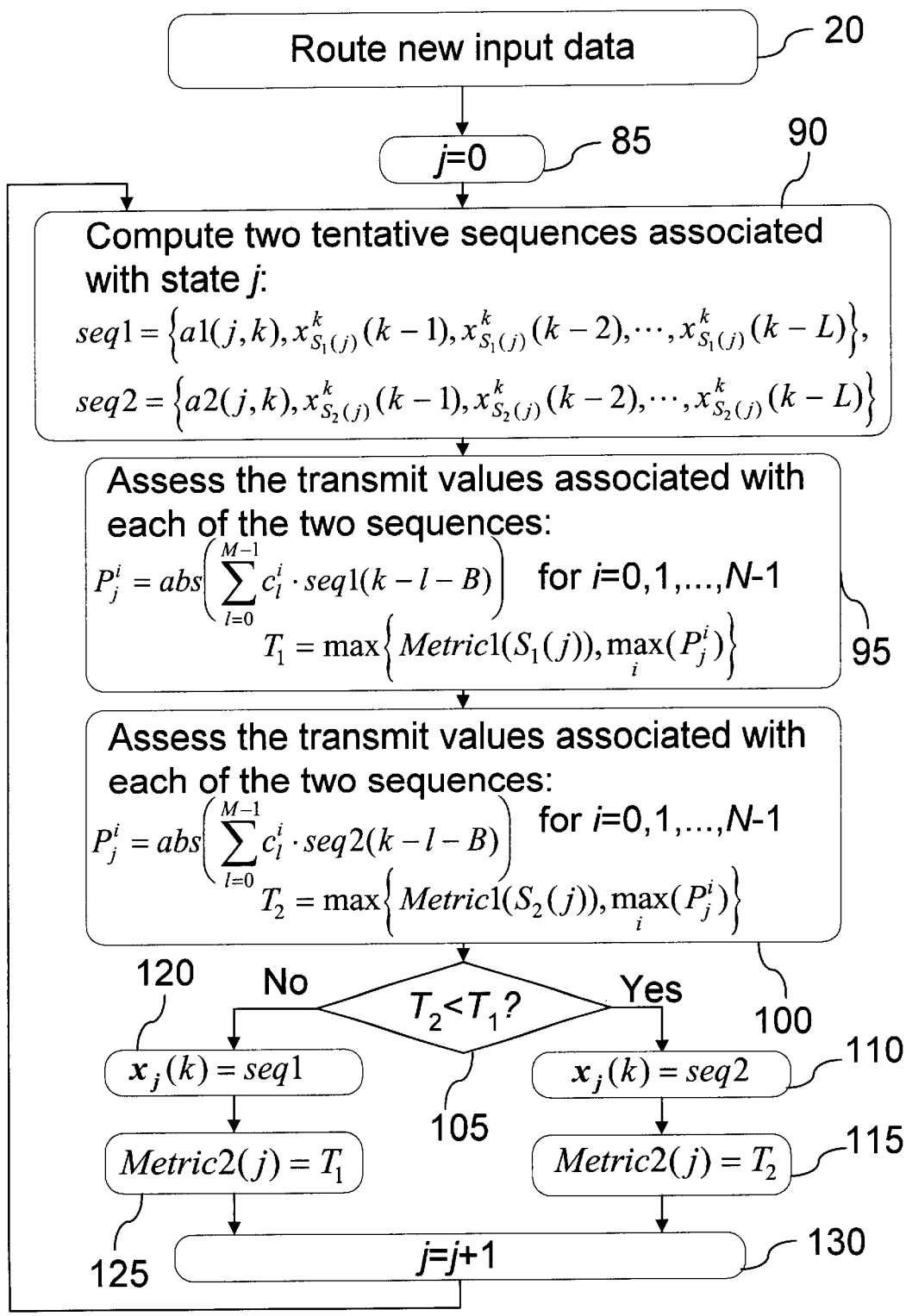
FIG. 7 is a simplified flowchart illustration of one possible method for implementing the Sequence Set Generator of FIG. 3, corresponding to the set generating step of FIG. 2.

The Sequence Set Generator (55) generates the set of all candidate sequences. FIG. 7 is a simplified flowchart illustration of one possible method for implementing the candidate Sequence Set Generator (55) of FIG. 3, corresponding to the set generating step of FIG. 2.

Figure 8:
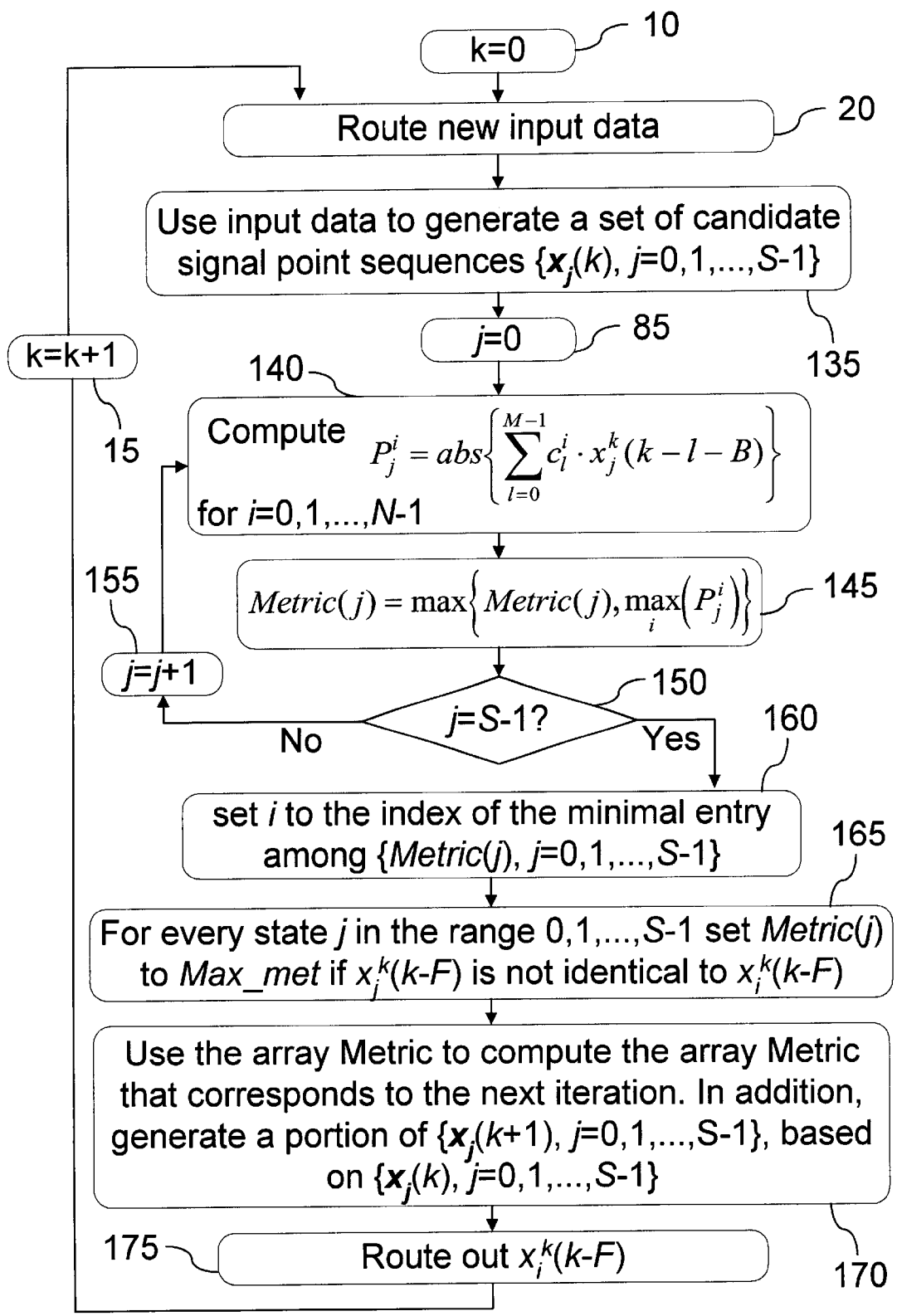
FIG. 8 is a simplified flowchart illustration of a general method for implementing the Interim Sequence Selector of FIG. 3, corresponding to the selecting step of FIG. 2.

The Interim Sequence Selector (60) selects one sequence for transmission, and maintains the required sequence memory. FIG. 8 is a simplified flowchart illustration of a general method for implementing the Interim Sequence Selector (60) of FIG. 3, corresponding to the selecting step of FIG. 2.

The method of FIG. 8, a preferred embodiment of the present invention, involves the following computations in which S candidate sequences are generated at each symbol iteration, and Metric(0:S−1) denotes S-element arrays that store the aggregate metrics (costs) of each one of the S candidate sequence. The plurality of sequences may be generated, for example, according to methods that have been proposed for shaping in the above referenced articles by Forney, 1992 and Fischer et al. 1995.

The candidate sequences are denoted by $x_i(k)$, i=1,2, . . . ,S, where $$x_i(k)=\{x_i^k(k), x_i^k(k-1), x_i^k(k-2), \ldots, x_i^k(k-L)\}.$$

A generic method for reducing the peak-to-average ratio (without shaping) is described hereinbelow. The method uses the functions abs(x) which denotes the absolute value of x, and the function arg min, which is defined as follows:

$$\arg\min\{Y_{j_1}, Y_{j_2}, \ldots Y_{j_N}\}=j_v, \text{ such that } Y_{j_v}=\min\{Y_{j_1}, Y_{j_2}, \ldots, Y_{j_N}\}.$$

State iteration: Prediction of the output level associated with the jth sequence at a set of finite time instances (140).
For i=0:N−1

$$P_j^i = \sum_{l=0}^{M-1} c_l^i \cdot x_j^k(k-l-B) \quad (140)$$

End of For loop
Update of the cost of the jth sequence according to the level estimates $P_j^i$(145).

$$\text{Metric}(j) = \max\{\text{Metric}(j), \max_i[\text{abs}(P_j^i)]\}, \quad (145)$$

The above computation is preferably repeated for all candidate sequences, and thereafter the symbol iteration is typically performed.

Symbol iteration: Selection of the best path (the path with minimum cost) (160).

$$i=\arg\min\{\text{Metric }(0:S-1)\} \quad (160)$$

For j=0:S−1
Check of path integrity (165).

if $x_j^k(k-F) \neq x_i^k(k-F)$ then Metric(j) Max_met, End if  (165)

End of For loop

Route out $x_i^k(k-F)$  (175)

When all the metrics reach the same value, one of the sequences is preferably chosen either by a predefined setting or at random. The choice of a winner sequence preferably guarantees a continuous path integrity in order to avoid systematic errors. Hence in each symbol iteration, the least recent sample of each one of the sequences is tested for discontinuities. The metrics that correspond to the paths whose least recent sample is not identical to that of the selected path are set to Max_met. The parameter Max_met may be determined as the maximum value attained by the metrics. This operation ensures that illegal sequences will not be generated. The metric values may be scaled by subtracting a constant value from all metrics at the end of each symbol iteration, or few iterations.

At the end of the iteration, the metric array that corresponds to the next iteration is preferably computed based on the values of the current metric array and the method used. Similarly, the candidate sequences $\{x_i(k), i=0,1, \ldots, S-1\}$ may be used to compute a portion of the candidate sequences for the next iteration, i.e., $\{x_i(k+1), i=0,1, \ldots, S-1\}$ (170).

The selection of the Interim Sequence Selector (60) is targeted to reduce the peak power of the transmitted signal and may also be based on the respective average powers of the candidate sequences (sum of square values of the samples). When a trellis code is used, the search can be depicted by two matrices: the transition matrix and the output matrix of the trellis code. It may be assumed that the edges of the diagram have binary labels, and that each trellis state is connected to two states in the previous (and also the subsequent) level. Consequently, if the diagram comprises S states, and each section of the trellis comprises 2S edges. The transition matrix comprises the information as to which states are branching into each trellis state. The output matrix lists the labels (outputs) of the corresponding edges, a1(j) and a2(j) associated with the two transitions to the jth trellis state, and it is thus code dependent. The output matrix describes which one of the symbols generated by the Symbol Generator (50) {SYM(0), SYM(1), . . . , SYM(J−1)} corresponds to the transition described by the transition matrix. The current values of these samples at time instant k, is denoted by a1(j,k) and a2(j,k). Both the transition matrix and the output matrix are S×2 matrices. The indices of the trellis states are denoted here onwards by {0,1,2, . . . ,S−1}. For any convolutional code, the following indexing convention may be used for operation on a trellis: the indices of the states branching into the jth state are 2·(j mod S/2) and 2·(j mod S/2)+1, where S is an integral power of 2. The entries of the output matrix are code dependent. For example the appropriate matrix for the code whose generator matrix was given above [$1+D+D^4$, $1+D^2+D^3+D^4$] is shown in FIG. 6.

Figure 9:
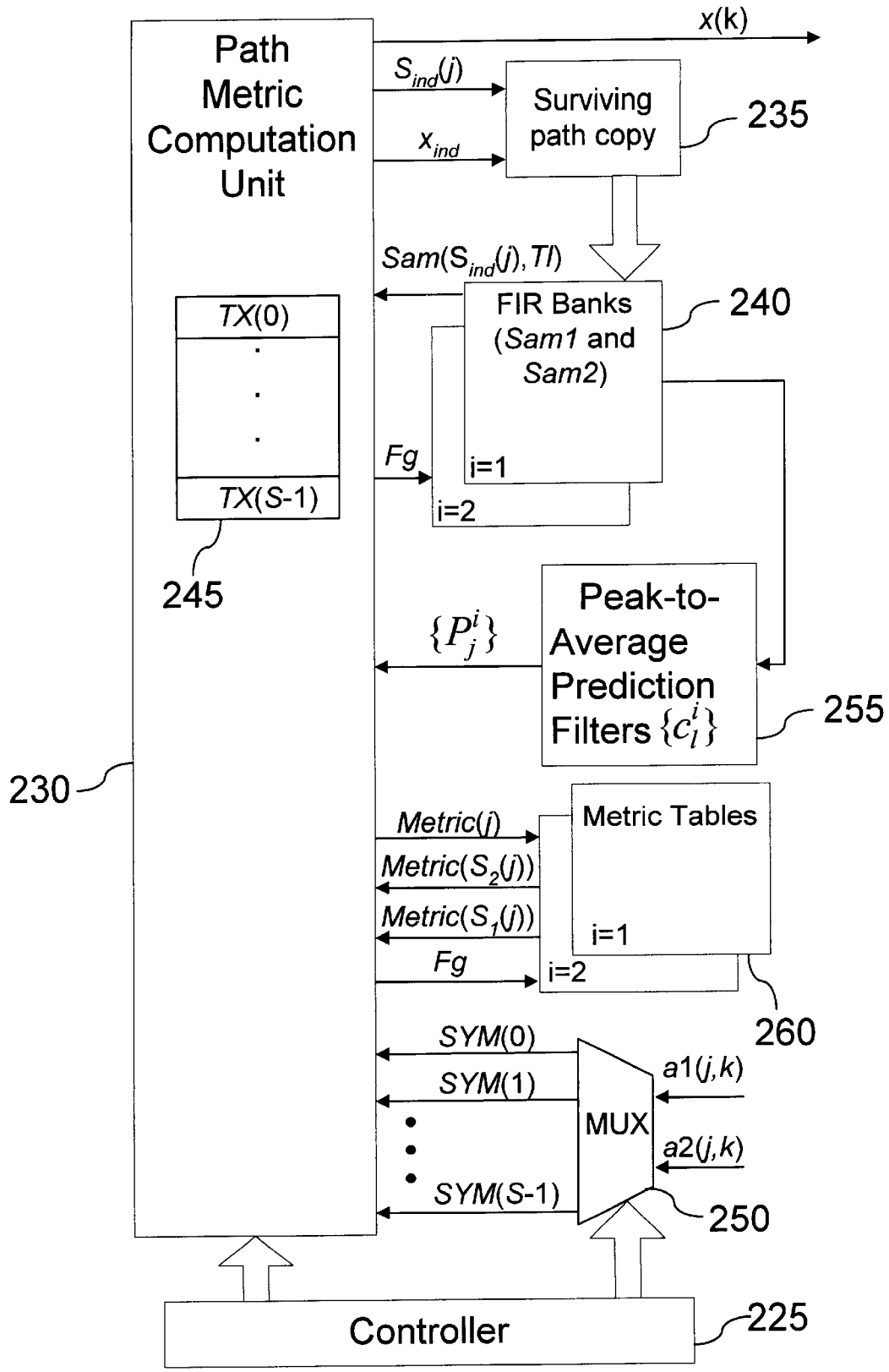
FIG. 9 is a simplified block diagram of the Sequence Set Generator and Interim Sequence Selector of FIG. 3, constructed and operative in accordance with a preferred embodiment of the present invention.

FIG. 9 depicts the combined operation of the Sequence Set Generator (55) and the Interim Sequence Selector (60), constructed and operative in accordance with a preferred embodiment of the present invention. These two units are interconnected, sharing the same arrays of data, and thus it is convenient to describe them in common. FIG. 9 portrays the data routing between the different subunits of this machine. The formulae that describe the operation of the different blocks are shown, and thereafter the entire iteration is listed in order to stress the relative timing of the various operations performed.

The following notation is employed:

Tl—The total number of recent samples saved for each candidate sequence and used to estimate the average power and the peak-to-average ratio associated with each of the sequences. This estimation is used to select one sequence for transmission. This number may also determine the delay of the decision made by the shaping method. a1(j,k) and a2(j,k) denote the two symbols generated by the Symbol Generator (50) and that correspond to the two branches that enter the jth trellis state at time instant k. Both a1(j,k) and a2(j,k) take on values of the symbol set generated by the Symbol Generator (50): {SYM(0),SYM(1), . . . ,SYM(S−1)}.

$S_1(j)$, and $S_2(j)$ will denote the indices of the two trellis states that branch into the jth trellis state.

Metric1(0:S−1), Metric2(0:S−1)—two S-element arrays that store the aggregate state metrics. These metrics represent the peak-to-average value associated with the different sequences. They may also represent the relative average powers of these sequences.

Sam1(0:S−1,1:Tl), Sam2(0:S−1,1:Tl)—Two-dimensional arrays. Each row in these arrays stores the sequence $x_j(k)$ that corresponds to one trellis state.

The updated metric memory at the end of each iteration uses some of the entries of the old buffers, and hence this operation entails the use of two metric buffers and a double sample array. Along the computation process we alter the entry of the flag Fg. This flag designates whether the updated data is stored in Metric1 and Sam1 or in Metric2 and Sam2.

TX(0:S−1)—A buffer whose jth entry is the sample to be chosen and routed out provided that the jth trellis state has the smallest metric, that is, at time instant k TX(j)=$x_j^k$(k−F).

A method for reducing the peak-to-average ratio of a transmitted signal, i.e. that generates the set of all candidate signal point sequences {$x_i(k)$, i=0,2, . . . ,S−1}, and chooses one sequence from among this class, is now described in detail. This description pertains to a transmitter that uses Pulse Amplitude Modulation (PAM), and, for simplicity, a shaping method based on a trellis code is used. This code defines the legal sequences, and it has an equivalent definition by two matrices: a transition matrix and an output matrix. The selection procedure is accomplished by a Viterbi-algorithm type search method.

Figure 10:
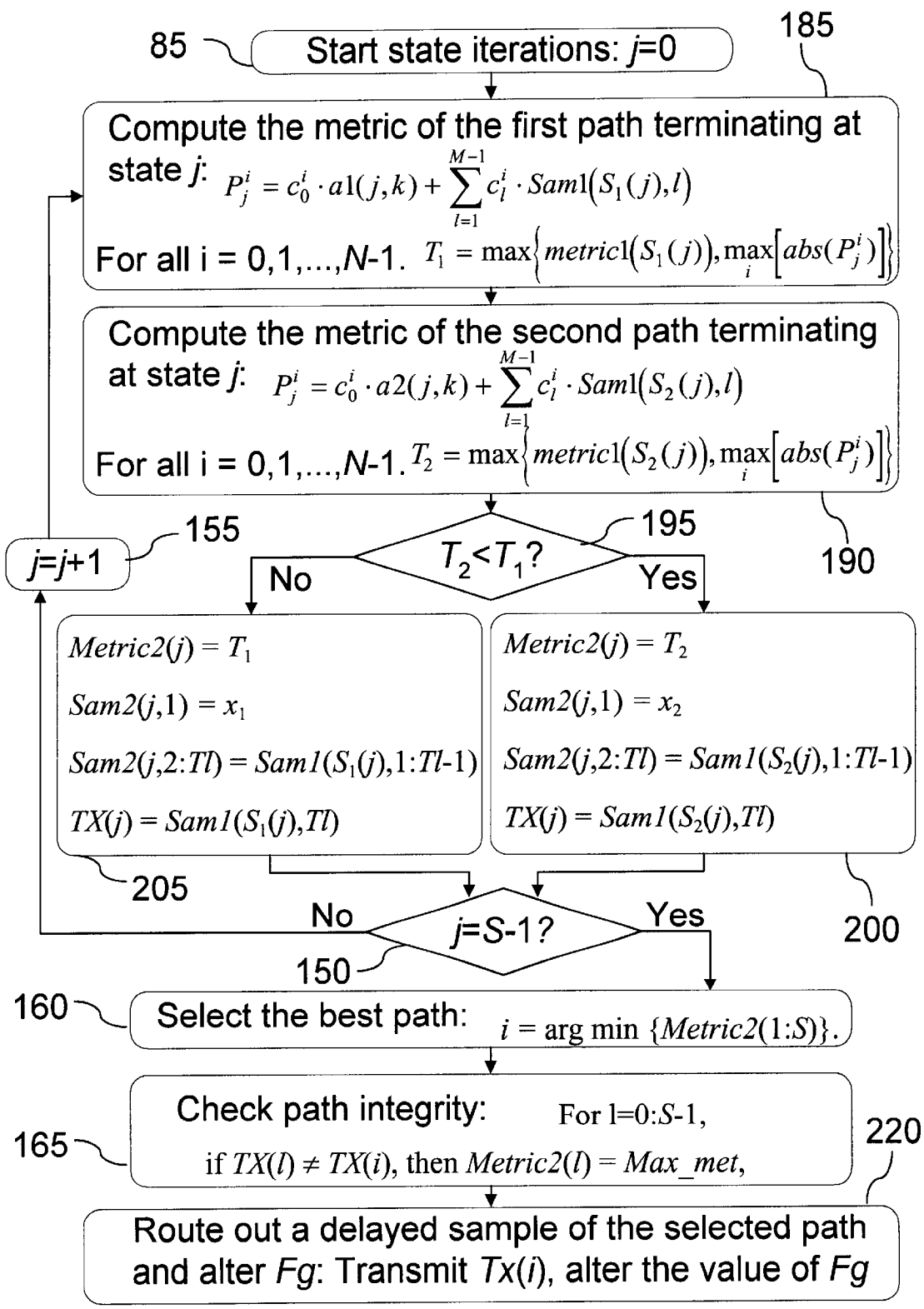
FIG. 10 is a simplified flowchart illustration of one implementation of the method of FIG. 8.

FIG. 10 is a simplified flowchart illustration of one implementation of the method of FIG. 8. Shown is a flowchart corresponding to Fg=1. For Fg=0, metric1 is replaced by metric2, and Sam1 is replaced by Sam2, and vice versa. A detailed method for performing the method of FIG. 10 is now described.

State iteration: evaluation of the metric of a sequence, prediction of peak-to-average value, and metric update. This computation is repeated for all candidate sequences. For the jth sequence and time instant k, the following computation is accomplished:

Computing the aggregate metrics that correspond to the two paths terminating at state j:
If Fg=1, then
For i=0:N−1

$$P_j^i = c_0^i \cdot a1(j,k) + \sum_{l=1}^{M-1} c_l^i \cdot Sam1(S_1(j), l) \qquad (185)$$

End of For loop (185)

$$T_1 = \max\{metric1(S_1(j)), \max_i\{P_j^i\}\} \qquad (185)$$

For i 0:N−1

$$P_j^i = c_0^i \cdot a2(j,k) + \sum_{l=1}^{M-1} c_l^i \cdot Sam1(S_2(j), l) \qquad (190)$$

End of For loop $$T_2 = \max\{metric1(S_2(j)), \max_i\{P_j^i\}\} \qquad (190)$$

Else
For i=0:N−1

$$P_j^i = c_0^i \cdot a1(j,k) + \sum_{l=1}^{M-1} c_l^i \cdot Sam2(S_1(j), l) \qquad (185)$$

End of For loop (185)

$$T_1 = \max\{metric2(S_1(j)), \max_i\{P_j^i\}\} \qquad (185)$$

For i=0:N−1

$$P_j^i = c_0^i \cdot a2(j,k) + \sum_{l=1}^{M-1} c_l^i \cdot Sam2(S_2(j), l) \qquad (190)$$

End of For loop $$T_2 = \max\{metric2(S_2(j)), \max_i\{P_j^i\}\} \qquad (190)$$

End if.

Metrics comparison and selection of a candidate sequence associated with state j:

$$T=\min\{T_1,T_2\}, \text{ind}=\arg\min\{T_1,T_2\},$$

Updating the corresponding metric value and the array of samples for the next iteration:
If Fg=1, then

| | |
|---|---|
| Metric2 (j)=$T_{ind}$ | (200, 205) |
| Sam2(j, 1)=$x_{ind}$ | (200, 205) |
| Sam2(j,2:Tl)=Sam1($S_{ind}(j)$,1:Tl−1) | (200, 205) |
| TX(j)=Sam1 ($S_{ind}(j)$, Tl) | (200, 205) | else

Metric1$(j)=T_{ind}$

Sam1$(j,1)=x_{ind}$

Sam1$(j,2:Tl)$=Sam2$(S_i(j), 1:Tl-1)$ $TX(j)$=Sam2$(S_{ind}(j),Tl)$

End if

The above computations are preferably repeated for all the S trellis states. At the end of this computation, the symbol iteration is typically performed.

Symbol iteration: Selection of the best path (the path with minimum cost) (160).

If Fg=1, then $i$=arg min {Metric2$(0:S-1)$}. (160)

For l=0:S−1

Check of path integrity (165).

if $TX(l) \neq TX(i)$, then Metric2$(l)$=Max_met, End if (165)

End of For loop
Else, $i$=arg min {Metric1$(0:S-1)$}.

For l=0:S−1 if $TX(l) \neq TX(i)$, then Metric1$(l)$=Max_met, End if

End of For loop
End if

Route out $TX(i)$ (220)

Alter $Fg$ value. (220)

Figure 11:
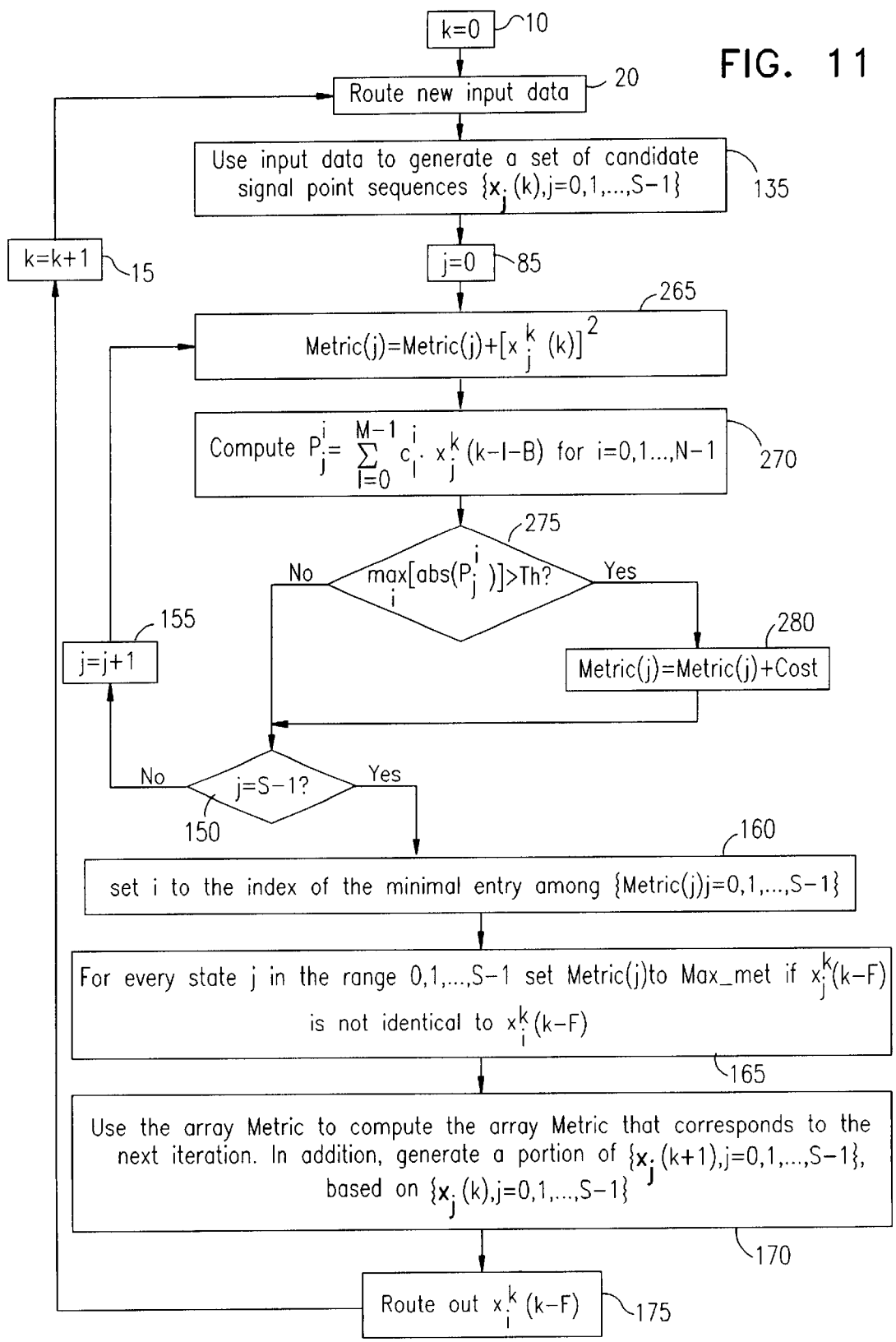
FIG. 11 is a simplified flowchart illustration of a modification of the selecting step of the method of FIG. 2, used in transmitters that incorporate shaping.

FIG. 11 is a simplified flowchart illustration of a modification of the selecting step (45) of the method of FIG. 2, used in transmitters that incorporate shaping. This modification of the selecting step obtains a low peak and a low average value of the transmitted signals.

State iteration: evaluation of the metric of a sequence, prediction of peak-to-average value, and metric update. This computation is repeated for all candidate sequences. For the jth sequence and time instant k, the following computation is accomplished:

Metric$(j)$=Metric$(j)$+$[x_j^k(k)]$, (265)

Clf=0
For i=0:N−1

$$P_j^i = \sum_{l=0}^{M-1} c_l^i \cdot x_j^k(k-l-B)$$ (270)

if abs $(P_j^i)$>Th, then Clf=1, End if
End of For loop
If Cf=1,then

Metric$(j)$=Metric$(j)$+Cost (280)

End if
Symbol iteration: Selection of the best path (the path with minimum cost) (160).

$i$=arg min {Metric$(0:S-1)$}. (160)

For j=0:S−1

Check of path integrity (165).

If $x_j^k(k-F) \neq x_i^k(k-F)$ then Metric$(j)$=Max_met, End if (165)

End of For loop

Route out $x_i^k(k-F)$ (175)

Figure 12:
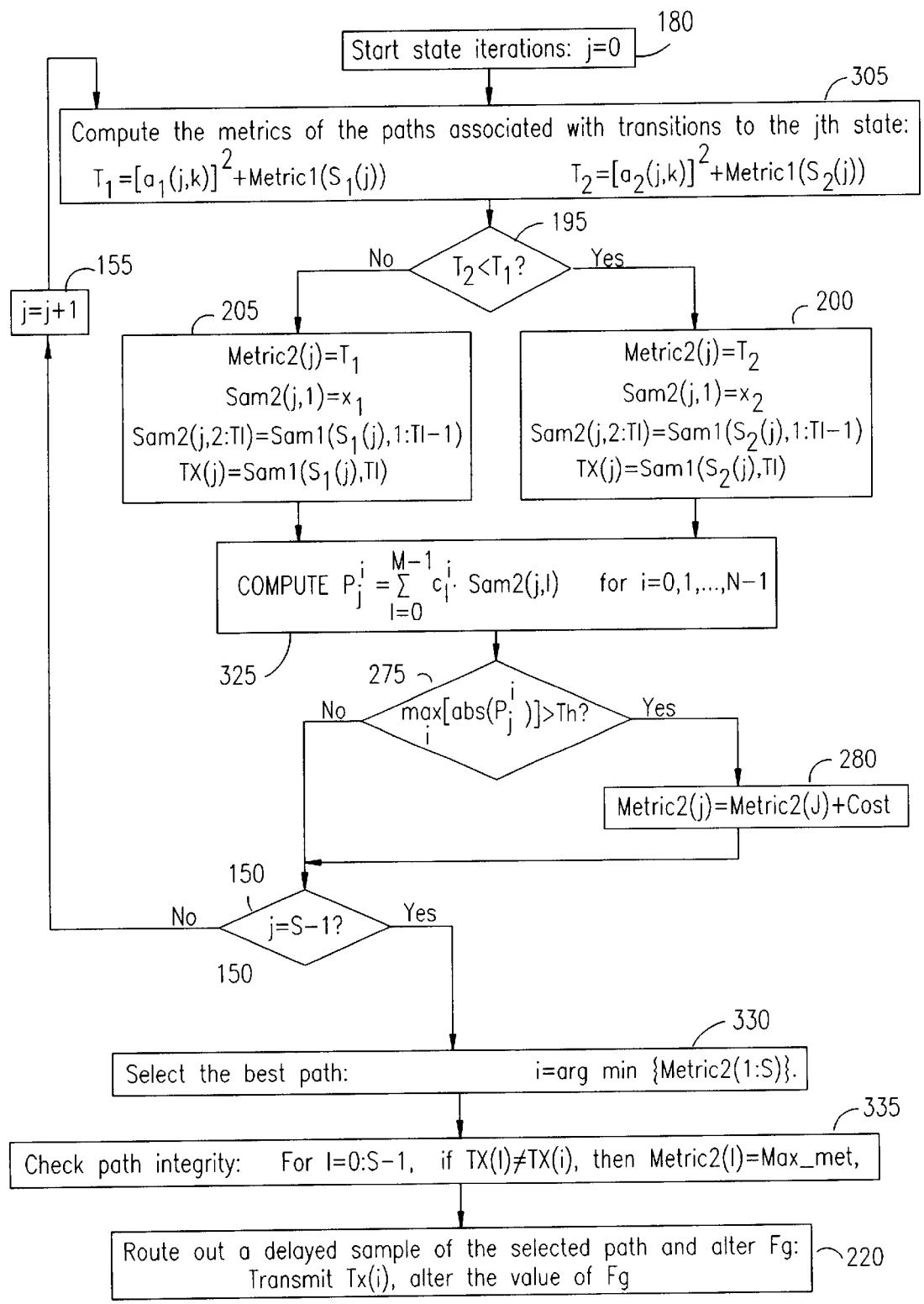
FIG. 12 is a detailed flowchart illustration of a modification of the selecting step of the method of FIG. 2, used in transmitters that incorporate shaping.

FIG. 12 is a detailed flowchart illustration of a modification of the selecting step of the method of FIG. 2. The method of FIG. 12 is similar to that of FIG. 11, except that the method of FIG. 12 also takes into account some implementational considerations, such as the use of two Metric arrays. Shown is a flowchart corresponding to Fg=1. For Fg=0, metric1 is replaced by metric2, and Sam1 is replaced by Sam2, and vice versa.

State iteration: evaluation of the metric of a sequence, prediction of peak-to-average value, and metric update. This computation is repeated for all candidate sequences. For the jth sequence and time instant k, the following computation is accomplished:

Computing the aggregate metrics that correspond to the two paths terminating at stated j:
If Fg=1, then $T_1$=Metric1$(S_1(j))$+$[a1(j,k)]^2$, (305)

$T_2$=Metric1$(S_2(j))$+$[a2(j,k)]^2$ (305)

Else $T_1$=Metric2$(S_1(j))$+$[a1(j,k)]^2$, $T_2$=Metric2$(S_2(j))$+$[a2(j,k)]^2$ End if
Metrics comparison:

$T$=min $\{T_1,T_2\}$, ind=arg min $\{T_1,T_2\}$,

Updating the corresponding metric value and the array of samples for the next iteration:
If Fg=1, then Metric2$(j)=T_{ind}$ (200, 205)

Sam2$(j,1)=x_{ind}$ (200, 205)

Sam2$(j,2:Tl)$=Sam1$(S_{ind}(j),1:Tl-1)$ (200, 205)

$TX(j)$=Sam1$(S_{ind}(j),Tl)$ (200, 205)

else

Metric1$(j)=T_{ind}$

Sam1$(j,1)=x_{ind}$

Sam1$(j,2:Tl)$=Sam2$(S_{ind}(j),1:Tl-1)$ $TX(j)$=Sam2$(S_{ind}(j),Tl)$

End if
Prediction of peak-to-average value:
Clf=0
If Fg=1, then

For i=0:N−1

$$P_j^i = \sum_{l=0}^{M-1} c_l^i \cdot Sam2(j, l) \quad (325)$$

if abs ($P_j^i$)>Th, then Clf=1, End if
End of For loop
Else
   For i=0:N−1

$$P_j^i = \sum_{l=0}^{M-1} c_l^i \cdot Sam1(j, l)$$

if abs ($P_j^i$)>Th, then Clf=1, End if
End of For loop
End if
If Clf=1, then if $Fg$=1, then Metric2($j$)=Metric2($j$)+Cost Else Metric1($j$)=Metric1($j$)+Cost End if
End if
Symbol iteration: Selection of the best path (the path with minimum cost) (330).
If Fg=1, then $i$=arg min {Metric2(0:$S$−1)}     (330)

For l=0:S−1

Check of path integrity     (335).

if $TX(l) \neq TX(i)$, then Metric2($l$)=Max_met, End if     (335)

End of For loop
Else, $i$=arg min {Metric1(0:$S$−1)}.

For l=0:S−1 if $TX(l) \neq TX(i)$, then Metric1($l$)=Max_met, End if

End of For loop
End if

Route out $TX(i)$     (220)

Alter $Fg$ value.     (220)

In the methods of FIGS. 8 and 10–12, when all the metrics reach the same value, one of the sequences is preferably chosen either by a predefined setting or at random. The choice of a winner sequence preferably guarantees a continuous path integrity in order to avoid systematic errors. Hence in each iteration, the least recent sample of each one of the sequences is tested for discontinuities. The metrics that correspond to the paths whose least recent sample is not identical to that of the chosen path are set to Max_met. The parameter Max_met may be determined as the maximum value attained by the metrics. This operation ensures that illegal sequences will not be generated. Also, from a practical point of view, the metric values may be scaled by subtracting a constant value from all metrics at the end of each symbol iteration or a few iterations.

Similarly, in a fixed-point implementation, the values reached by the metric array are preferably saturated when exceeding a predetermined value (which is induced by the specific bit resolution of the implementation).

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A system for mapping digital input data, comprising a sequence of input samples, into an interim signal point sequence, for use in conjunction with a single carrier modulation transmitter, the system comprising:
   a candidate set generator operative to generate a set of candidate signal point sequences characterized in that the original digital input data is recoverable from a final signal derived from said candidate signal point sequences; and
   an interim signal point sequence selector operative, for each input sample, to select an interim signal point sequence, into which to map the sequence, from among the set of candidate signal point sequences, so as to obtain a low peak power value of a final signal generated from the interim signal point sequence by a signal processing unit, relative to the peak power values of the final signals generated respectively by other sequences within said set of candidate signal point sequences, by said signal processing unit,
   wherein the final signal is composed of a sequence of samples each derived from the interim signal point sequence selected for a corresponding input sample,
   and wherein the original digital input data is recoverable by a receiver without knowledge as to the identity of the interim signal point sequence selected for each input sample,
   wherein the sequence selector comprises a set of prediction filters operative to predict an output signal level of the signal processing unit if each of said candidate signal point sequences in said candidate sequence set is selected, and wherein selection of an interim sequence is at least partially based on the output of said prediction filters.

2. A method for mapping digital input data, comprising a sequence of input samples, into an interim signal point sequence, for use in conjunction with a single carrier modulation transmitter, the method comprising:
   generating a set of candidate signal point sequences characterized in that the original digital input data is recoverable from a final signal derived from said candidate signal point sequences;
   for each input sample, selecting an interim signal point sequence, into which to map the sequence of input samples, from among the set of candidate signal point sequences, so as to obtain a low peak power value of a final signal generated from the interim signal point sequence by a signal processing unit, relative to the peak power values of the final signals generated respectively by other sequences within said set of candidate signal point sequences by said signal processing unit; and using a single carrier modulation transmitter to transmit the final signal generated from the interim signal point sequence, sample by sample, to a receiver, thereby to reduce the peak power value of the final signal generated from the interim signal point sequence for each individual input sample in an input data sequence, relative to the peak power value of a final signal generated from a single, fixed signal point assigned to said individual input sample in said input data sequence;

wherein the final signal is composed of a sequence of samples each derived from the interim signal point sequence selected for a corresponding input sample, and wherein the original digital input data is recoverable by the receiver without knowledge as to the identity of the interim signal point sequence selected for each input sample, wherein the selecting step comprises employing a set of prediction filters to predict an output signal level of the signal processing unit if each of said candidate signal point sequences in said candidate sequence set is selected, and wherein selection of an interim sequence is at least partially based on the output of said prediction filters.

3. A method according to claim 2, and also comprising, at the receiver, receiving and recovering the original digital input data without using information regarding the selecting step.

4. A method according to claim 2 wherein said selecting step is also operative to select the interim signal point sequence so as to obtain a relatively low average power value of the final signal generated from the interim signal point sequence by the signal processing unit, relative to the average power values of the final signals generated respectively from other sequences from among said set of candidate signal point sequences by said signal processing unit, thereby to reduce the average power value of the final signal generated from the interim signal point sequence for each individual input sample in an input data sequence, relative to the average power value of a final signal generated from a single, fixed signal point assigned to said individual input sample in said input data sequence, for any given signal processing unit.

5. A method according to claim 2 wherein said selecting step is also operative to select the interim signal point sequence so as to obtain a relatively low average power value of the interim signal point sequence, relative to the average power values of the other sequences from among said set of candidate signal point sequences, thereby to reduce the average power value of the interim signal point sequence for each individual input sample in an input data sequence, relative to the average power value of a single, fixed signal point assigned to said individual input sample in said input data sequence, for any given signal processing unit.

6. A method according to claim 2 wherein said selecting step is based at least partly on an analysis of the average power value of the final signal generated from the interim signal point sequence by the signal processing unit.

7. A method according to claim 2 wherein said selecting step is based at least partly on an analysis of the average power value of the interim signal point sequence.

8. A transmitter, which processes data for transmission, the data including a succession of input data samples, the transmitter comprising:

a candidate set generator, which generates a set of candidate signal point sequences responsive to the input data samples, such that the input data samples are recoverable from a final signal derived from the candidate signal point sequences;

a set of one or more prediction filters, which predict respective output signal levels of the candidate signal point sequences;

an interim signal point sequence selector, which maps the succession of input data samples into a succession of interim point sequences from among the candidate signal point sequences, responsive to the output signal levels predicted by the prediction filters, thus generating the final signal;

a signal processing unit, which processes the final signal for transmission; and transmit circuitry, which transmits the processed final signal to a receiver.

9. A transmitter according to claim 8, wherein the set of prediction filters predict the output signal levels responsive to a response of the signal processing unit.

10. A transmitter according to claim 9, wherein the set of prediction filters predict the output signal levels responsive to an approximation of the impulse response of the signal processing unit.

* * * * *